United States Patent
Belzowski et al.

(10) Patent No.: US 12,281,855 B2
(45) Date of Patent: Apr. 22, 2025

(54) HEAT EXCHANGER

(71) Applicant: Valeo Autosystemy Sp. z o.o., Skawina (PL)

(72) Inventors: Michal Belzowski, Skawina (PL); Karol Pokrywinski, Skawina (PL); Dawid Szostek, Skawina (PL); Condro Sekti, Bietigheim-Bissingen (DE); Jugurtha Benouali, Le Mesnil Saint-Denis (FR)

(73) Assignee: VALEO AUTOSYSTEMY SP. Z O.O, Skawina (PL)

( * ) Notice: Subject to any disclaimer, the term of this patent is extended or adjusted under 35 U.S.C. 154(b) by 513 days.

(21) Appl. No.: 17/599,091

(22) PCT Filed: Mar. 23, 2020

(86) PCT No.: PCT/EP2020/057922
§ 371 (c)(1),
(2) Date: Sep. 28, 2021

(87) PCT Pub. No.: WO2020/193454
PCT Pub. Date: Oct. 1, 2020

(65) Prior Publication Data
US 2022/0196334 A1    Jun. 23, 2022

(30) Foreign Application Priority Data
Mar. 28, 2019 (EP) .................................... 19461521

(51) Int. Cl.
F28D 7/16 (2006.01)
(52) U.S. Cl.
CPC ..................... F28D 7/16 (2013.01)

(58) Field of Classification Search
CPC ............... F28D 7/16; F28D 2021/0084; F28D 2021/0085; F28D 1/05391; F28D 1/05375;
(Continued)

(56) References Cited

U.S. PATENT DOCUMENTS 5,203,407 A    4/1993  Nagasaka
6,062,303 A *  5/2000  Ahn .................... F28F 27/02
                                            165/110

(Continued)

FOREIGN PATENT DOCUMENTS

| CN | 1206098 A | 1/1999 |
|---|---|---|
| CN | 103983126 A | 8/2014 |

(Continued)

OTHER PUBLICATIONS

International Search Report and Written Opinion issued in corresponding International Application No. PCT/EP2020/057922, mailed Jun. 22, 2020 (9 pages).

(Continued)

*Primary Examiner* — Nelson J Nieves
*Assistant Examiner* — Matthew John Moscola
(74) *Attorney, Agent, or Firm* — Osha Bergman Watanabe & Burton LLP

(57) ABSTRACT

A heat exchanger having multiple segments is described. The heat exchanger includes a pair of manifolds, having tubes extending therein. Further, a first blocking element is provided in a manifold to divide the tubes into a first set of tubes and a second set of tubes having a fluid communication with each other. Further, a second blocking element is provided in the manifold, corresponding to the second set of tubes, to further divide the second set of tubes into a first segment of tubes and a second segment of tubes. Further, an inlet is provided on the manifold to introduce the heat (Continued)

exchange fluid to the first set of tubes. Further, a plurality of outlets provided on the manifold to receive the heat exchange fluid from the second set of tubes.

9 Claims, 5 Drawing Sheets

(58) Field of Classification Search
CPC .. B60H 1/00328; F28F 9/0209; F28F 9/0212; F28F 9/028; F28F 2250/06
See application file for complete search history.

(56) References Cited

U.S. PATENT DOCUMENTS

| | | | | |
|---|---|---|---|---|
| 6,082,447 | A * | 7/2000 | Insalaco | F28D 1/0408 165/174 |
| 2002/0053288 | A1 * | 5/2002 | Takahashi | F28D 7/0066 55/342.2 |
| 2015/0053383 | A1 | 2/2015 | Citti et al. | |
| 2015/0260458 | A1 * | 9/2015 | Goel | F28F 27/02 165/96 |
| 2015/0377560 | A1 * | 12/2015 | Szostek | F28F 9/0214 165/173 |
| 2016/0327317 | A1 * | 11/2016 | Inoue | F28D 1/0471 |
| 2017/0241686 | A1 * | 8/2017 | Szostek | F25B 40/02 |
| 2017/0299284 | A1 * | 10/2017 | Jindou | F28D 1/047 |

FOREIGN PATENT DOCUMENTS

| CN | 104321607 A | 1/2015 |
|---|---|---|
| CN | 105431704 A | 3/2016 |
| CN | 107091588 A | 8/2017 |

OTHER PUBLICATIONS

Office Action Issued in Corresponding CN Application No. 202080032055.4, Dated Mar. 16, 2023. (7 Pages).

* cited by examiner 226, 228, 302, 402

HEAT EXCHANGER

The present invention generally relates to heat exchangers, and in particularly, the heat exchangers having multiple segments to enable uniform distribution of heat exchange fluid in the heat exchangers.

Generally, HVAC systems are implemented in vehicles to provide comfort driving to the driver and occupants. The HVAC system generally includes heat exchangers (i.e., evaporators, condensers), an expansion valve and a compressor. The heat exchangers are connected to the expansion valve and the compressor through conduits for circulation of refrigerant. Typically, the heat exchangers are provided with heat tubes/plates extending between two manifolds, and a baffle/blocking member is provided in a manifold to divide the heat tubes into a first portion of tubes and a second portion of heat tubes in a fluid communication with each other. Each portion of heat tubes may include an opening for introducing/receiving the refrigerant into the heat tubes based on the type of mode.

The refrigerant flows through the tubes in the first portion of tubes and the second portion of tubes to absorb heat from the first portion of tubes and second portion of tubes respectively. As the refrigerant absorbs heat from the first portion of tubes, the density of the refrigerant is reduced. Then, the refrigerant enters into the second portion of tubes and is non-uniformly distributed in the second portion of tubes due to lower density of the refrigerant. Generally, when the density of refrigerant reduces, the refrigerant will follow a path of low resistance and exit the heat exchanger. As the refrigerant is non-uniformly distributed in the second portion of tubes, heat exchange between the refrigerant in the second portion of tubes and air is not uniform, which affects efficiency of the heat exchanger. Due to non-uniform distribution of refrigerant in the second portion of tubes, so called dead zones are created where the heat exchange is sub-optimal.

In FIG. 1, a thermal image of the conventional heat exchanger 100 is presented. In the conventional heat exchanger 100, an outlet is provided in a top section of the second portion of tubes 104, so when the refrigerant enters into the second portion of tubes 104, the refrigerant is unevenly distributed in the second portion of tubes 104 which causes formation of the dead zones 102 in the lower section of the second portion of tubes 104. If the outlet is repositioned to a lower section of the second portion of tubes 104, the dead zones 102 are formed in the top section of the second portion of tubes 104. To overcome such shortcomings, two outlets are provided in the second portion of manifold cooperating with the second portion of tubes. However, such design again leads to fast egress of the refrigerant from the second portion of tubes without getting distributed to whole area of the second portion of tubes since the refrigerant follows less resistant path to egress from the heat exchanger. Hence, the heat exchange rate is not optimal.

Accordingly, there is a need for a heat exchanger allowing uniform distribution of refrigerant throughout the heat exchange elements present in the heat exchanger to enhance the efficiency of the heat exchanger.

Another object of the present invention is to reduce dead zones created in the heat exchange elements of the heat exchanger that affect efficiency of the heat exchanger.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

In view of the foregoing, an embodiment of the invention herein provides a heat exchanger having multiple segments to provide optimum heat exchange rate. The heat exchanger includes a first manifold, a second manifold provided opposite to the first manifold, a plurality of tubes, a first blocking element, a second blocking element, an inlet and a plurality of outlets. The plurality of tubes is extended between the first manifold and the second manifold to enable flow of heat exchange fluid in the plurality of tubes. The first blocking element is provided in the first manifold to divide the plurality of tubes into a first set of tubes and a second set of tubes. The second set of tubes is in a fluid communication with the first set of tubes through the second manifold. The inlet is provided on the first manifold, corresponding to the first set of tubes, to introduce the heat exchange fluid to the first set of tubes. The second blocking element is provided in the first manifold, corresponding to the second set of tubes, to further divide the second set of tubes into a first segment of tubes and a second segment of tubes. Further, direction of flow of the heat exchange fluid is same in both the first segment of tubes and the second segment of tubes. The plurality of outlets is provided on the first manifold, corresponding to the second set of tubes, to receive the heat exchange fluid from the second set of tubes.

In one embodiment, the plurality of outlets comprises a first outlet and a second outlet. The first outlet may be provided on the first manifold, corresponding to the first segment of tubes, to egress the heat exchange fluid from the first segment of tubes. The second outlet may be provided on the first manifold, corresponding to the second segment of tubes, to receive the heat exchange fluid from the second segment of tubes.

In another embodiment, the heat exchanger further includes a first perforated blocking element that is adapted to cooperate with at least few of the second set of tubes in the first manifold, to increase pressure drop of the heat exchange fluid at the exit of the second set of tubes.

In another embodiment, the first perforated blocking element provided in the first manifold is adapted to partially block the passage of the second outlet to facilitate uniform distribution of the heat exchange fluid in the second set of tubes.

In yet another embodiment, the heat exchanger further includes a second perforated blocking element and a third perforated blocking element. The second perforated blocking element and the third perforated blocking element are provided in the second manifold and the first manifold respectively, corresponding to the second segment of tubes, to limit flow of the heat exchange fluid into the second segment of tubes that enables uniform distribution of the heat exchange fluid in the second set of tubes.

In accordance to an embodiment, the heat exchanger further includes a fourth perforated blocking element that is provided in the first manifold, corresponding to the first set of tubes, to enable uniform distribution of the heat exchange fluid in the first set of tubes.

In one embodiment, number of tubes in the second set of tubes is higher than the number of tubes in the first set of tubes, and the number of tubes in the first segment of tubes is higher than the number of tubes in the second segment of tubes.

In accordance with another embodiment, the heat exchanger includes a jumper line that is adapted to connect the first outlet and the second outlet to merge the first outlet and the second outlet fluidically and allow formation an outlet block.

In another embodiment, the first perforated blocking element, the second perforated blocking element, the third perforated blocking element, and the fourth perforated blocking elements are baffles having at least one of holes, vents and combination thereof.

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein.

It must be noted that the figures disclose the invention in a detailed enough way to be implemented, the figures helping to better define the invention if needs be. The invention should however not be limited to the embodiment disclosed in the description.

The present invention relates to a heat exchanger having multiple segments to enable uniform distribution of heat exchange fluid in heat exchange elements. According to the aspect, the heat exchanger includes a pair of manifolds and heat exchange elements extending between the pair of manifolds. A pair of blocking elements is introduced into a manifold to divide the heat exchange elements into multiple sets of tubes. The heat exchange fluid may circulate from a first set of tubes to a second set of tubes amongst the multiple sets of tubes. Further, a baffle is provided in the second set of tubes to increase pressure drop of the heat exchange fluid in the second set of tubes. As the baffle is provided to increase the pressure drop of the heat exchange fluid, the heat exchange fluid distribution is improved in the second set of tubes.

While aspects relating to a blocking element provided in a heat exchanger to form a first set of tubes and a second set of tubes as described above and henceforth can be implemented in any number of baffles provided in the heat exchanger to form multiple sets of tubes, the embodiments are described in the context of the following system(s).

Figure 1:
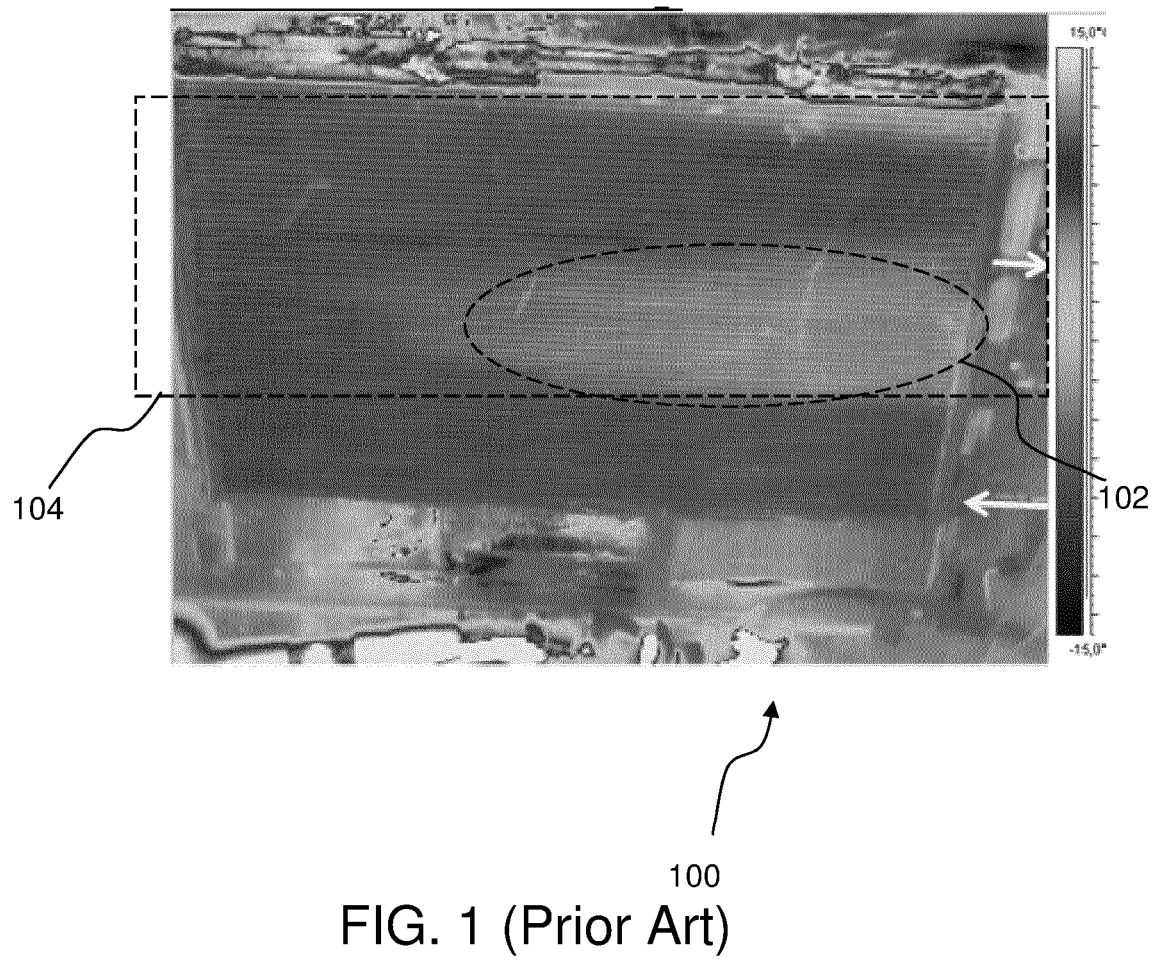
FIG. 1 illustrates a thermal image of the conventional heat exchanger, showing an embodiment from a prior art.
Figure 2:
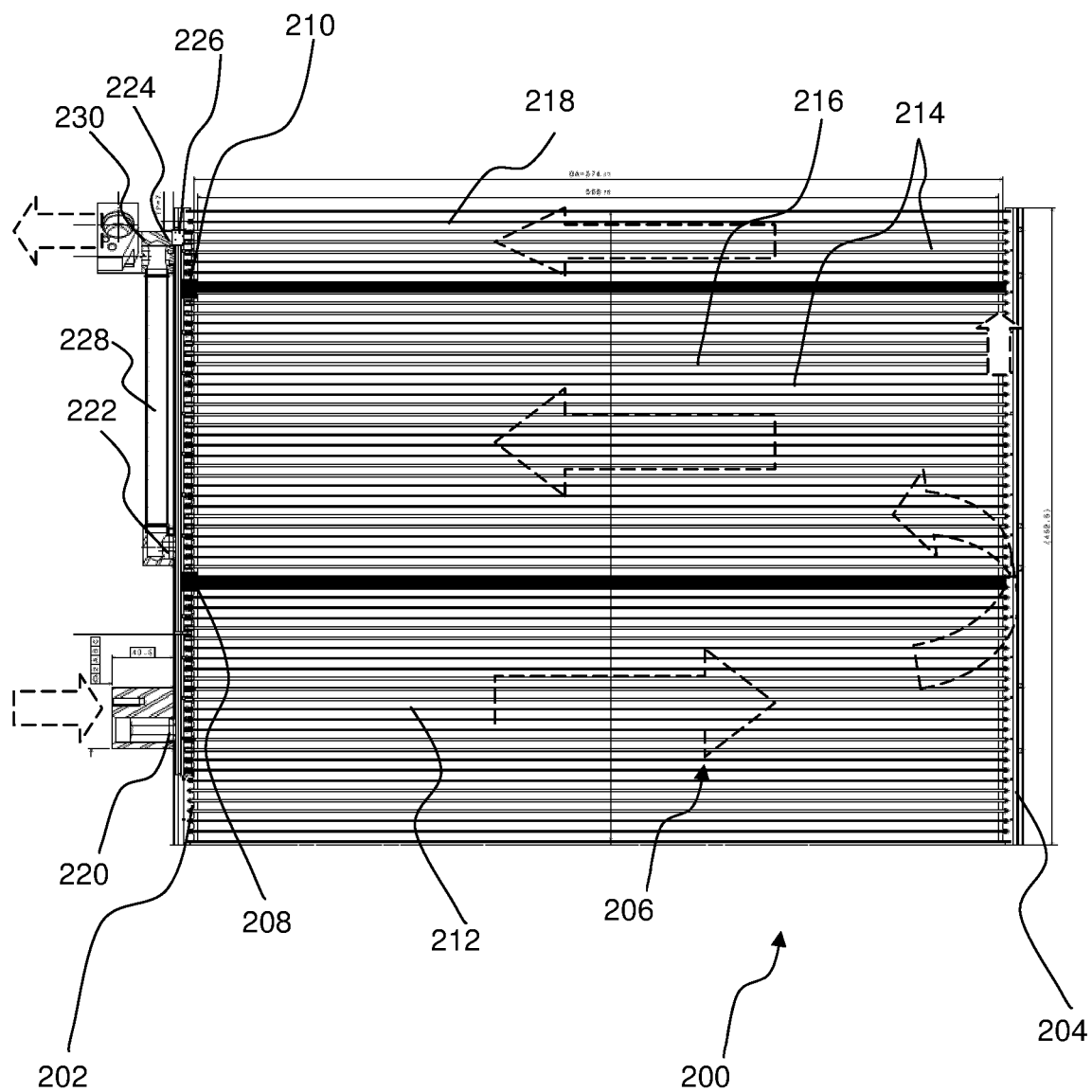
FIG. 2 illustrates a schematic view of a multi-segment heat exchanger, in accordance with an embodiment of the present invention.

FIG. 2 illustrates a schematic view of a multi-segment heat exchanger 200, in accordance with an embodiment of the present subject matter. The multi-segment heat exchanger 200 will be referred to as a heat exchanger 200 hereafter. The heat exchanger 200 includes a first manifold 202, a second manifold 204, and a plurality of heat exchange elements 206 extending between the first manifold 202 and the second manifold 204. In one embodiment, the first manifold 202 and the second manifold 204 include slots to receive the plurality of heat exchange elements 206 and distribute heat exchange fluid to the plurality of heat exchange elements 206. In one example, the plurality of heat exchange elements 206 may be tubes or plates. Hereinafter, the plurality of heat exchange elements 206 will be referred to as a plurality of tubes 206. Further, blocking elements are provided in the first manifold 202 to divide the plurality of tubes 206 into multiple segments of tubes. For instance, the blocking elements comprise a first blocking element 208, and a second blocking element 210. The first blocking element 208 is provided in the first manifold 202 to divide the plurality of tubes 206 into a first set of tubes 212 and a second set of tubes 214. The first set of tubes 212 is in a fluid communication with the second set of tubes 214 through the second manifold 204. In other words, as the first blocking element 208 is provided in the first manifold 202, the second set of tubes 214 receives the heat exchange fluid from the first set of tubes 212 through the second manifold 204. The heat exchange fluid, hereinafter referred to as refrigerant, is adapted to flow from the first manifold 202 to the second manifold 204 through the first set of tubes 212. Further, the refrigerant is adapted to flow from the second manifold 204 to the first manifold 202 in the second set of tubes 214.

The second blocking element 210 is provided in the first manifold 202 corresponding to the second set of tubes 214. In other words, the second blocking element 210 provided in the first manifold 202 in such a way that the second blocking element 210 lies in a portion of the first manifold 202 where the second set of tubes 214 are received. Further, the second blocking element 210 is adapted to divide the second set of tubes 214 into a first segment of tubes 216 and a second segment of tubes 218. The refrigerant flows in the same direction in both the first segment of tubes 216 and the second segment of tubes 218. In other words, the refrigerant flows from the second manifold 204 to the first manifold 202 in both the first segment of tubes 216 and the second segment of tubes 218. Further, an inlet 220 is provided on the first manifold 202 corresponding to the first set of tubes 212 to introduce the refrigerant to the first set of tubes 212. In other words, the inlet 220 is coupled to the first manifold 202 in such a way that the inlet 220 provides the refrigerant exclusively to the first set of tubes 212.

Further, a plurality of outlets is coupled to the first manifold 202 corresponding to the second set of tubes 214. In other words, the plurality of outlets is provided on the first manifold 202 in such a way that the plurality of outlets receives the refrigerant from the second set of tubes 214. In one embodiment, the plurality of outlets includes a first outlet 222, and a second outlet 224. The first outlet 222 is provided on the first manifold 202, corresponding to the first segment of tubes 216, to receive the refrigerant from the first segment of tubes 216. Further, the second outlet 224 is provided on the first manifold 202, corresponding to the second segment of tubes 218, to receive the refrigerant from the second segment of tubes 218.

The heat exchanger 200 may further comprise a first perforated blocking element 226 cooperatively coupled to at least few of the second set of tubes 214 in the first manifold 202 to increase pressure drop of the refrigerant at the exit of the second set of tubes 214. In one embodiment, the first perforated blocking element 226 provided in the first manifold 202 is adapted to partially block the passage of the second outlet 224 to facilitate uniform distribution of the refrigerant in the second set of tubes 214. In other words, the first perforated blocking element 226 is provided in the first manifold 202 in such a way that the first perforated blocking element 226 blocks the refrigerant flowing to the second outlet 224. Further, the first perforated blocking element 226 is adapted to limit the refrigerant flow in the second segment of tubes 218 which enables uniform distribution of the refrigerant throughout the second set of tubes 214. In heat pump mode, when the refrigerant enters into the first set of tubes 212 from the inlet 220, the refrigerant absorbs heat from the air present around the first set of tubes 212 and the density of the refrigerant is reduced due to heat exchange between the refrigerant and the air. Thereafter, density varied refrigerant enters into the second set of tubes 214 and absorbs heat from the air present around the second set of tubes 214. As the density of refrigerant entering into the second set of tubes 214 is lesser as compared to the density of refrigerant entering into the first set of tubes 212, the refrigerant may inadequately absorb heat and then exit through the plurality of outlets. To alleviate such effect, the first perforated blocking element 226 is provided in the first manifold 202 which partially blocks the refrigerant flowing through the second outlet 224. The first perforated blocking element 226 may partially block flow of the refrigerant and consequently improve distribution of the refrigerant in the second set of tubes 214.

In one embodiment, number of tubes in the second set of tubes 214 is higher than the number of tubes in the first set of tubes 212. In another embodiment, the number of tubes in the first segment of tubes 216 is higher than the number of tubes in the second segment of tubes 218. Further, the heat exchanger 200 may further include a jumper line 228 adapted to connect the first outlet 222 and the second outlet 224 to merge them fluidically and enable formation of an outlet block 230. For example, the refrigerant received at the first outlet 222 is transferred to the outlet block 230 where the refrigerant from the second outlet 224 also received.

Figure 3:
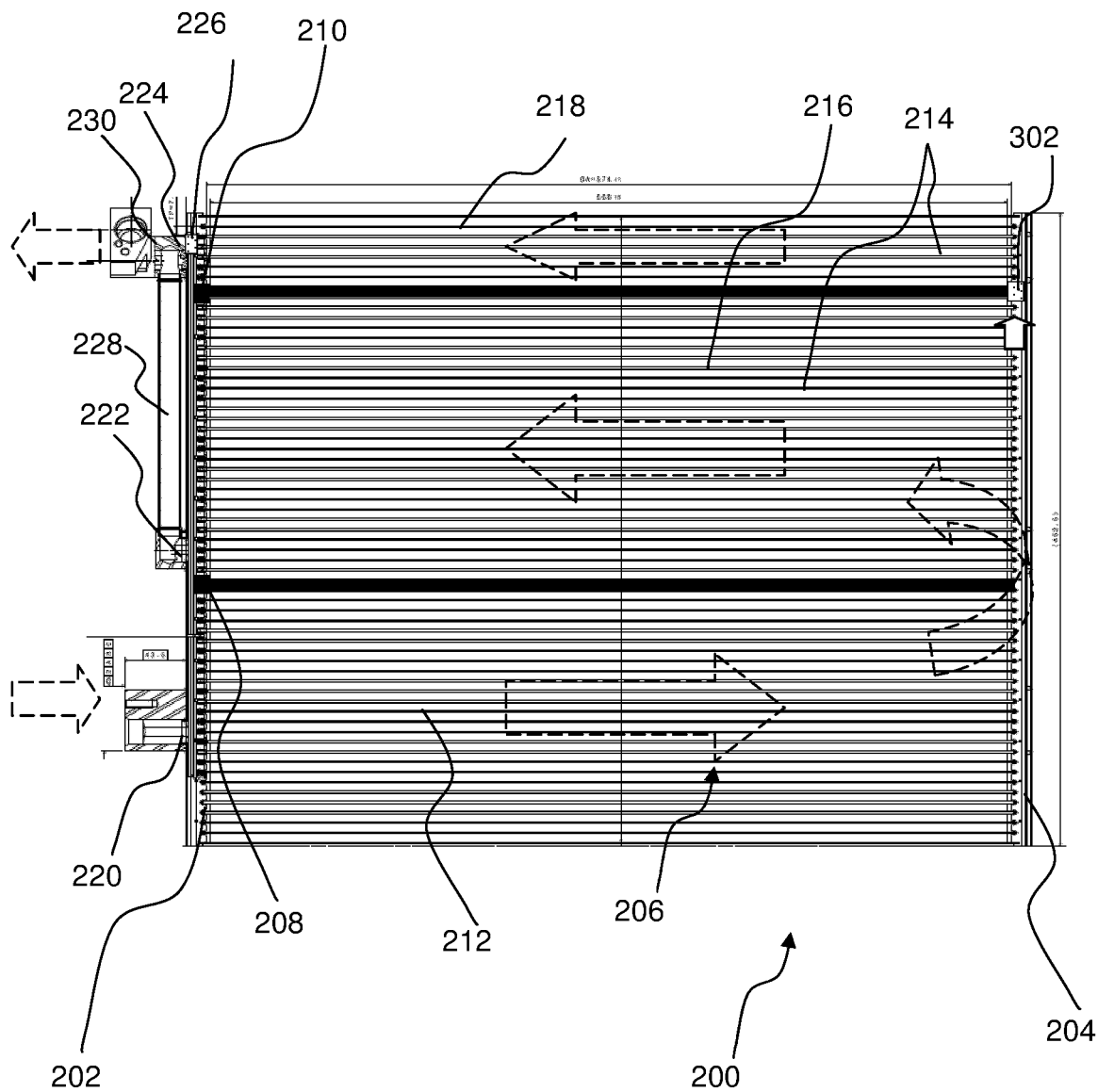
FIG. 3 illustrates a schematic view of the multi-segment heat exchanger, in accordance with an embodiment of the present invention having a perforated blocking element.

FIG. 3 illustrates a schematic view of the heat exchanger 100 having a second perforated blocking element 302 in the second manifold 204. In heat pump mode, flow of the refrigerant in the second segment of tubes 218 is high as compared to the refrigerant flow in the first segment of tubes 216 which leads to an inefficient heat exchange in the first segment of tubes 216. To alleviate such effect, the second perforated blocking element 302 is provided in the second manifold 204 as shown in FIG. 3. The second perforated blocking element 302 is coupled to the second manifold 204 corresponding to the second set of tubes 214. In one embodiment, the second perforated blocking element 302 is placed in the second manifold 204 in such a way that the second perforated blocking element 302 is parallel to the second blocking element 210. The second perforated blocking element 302 is adapted to limit the flow of refrigerant into the second segment of tubes 218, which results in uniform distribution of the refrigerant throughout the second set of tubes 214.

Figure 4:
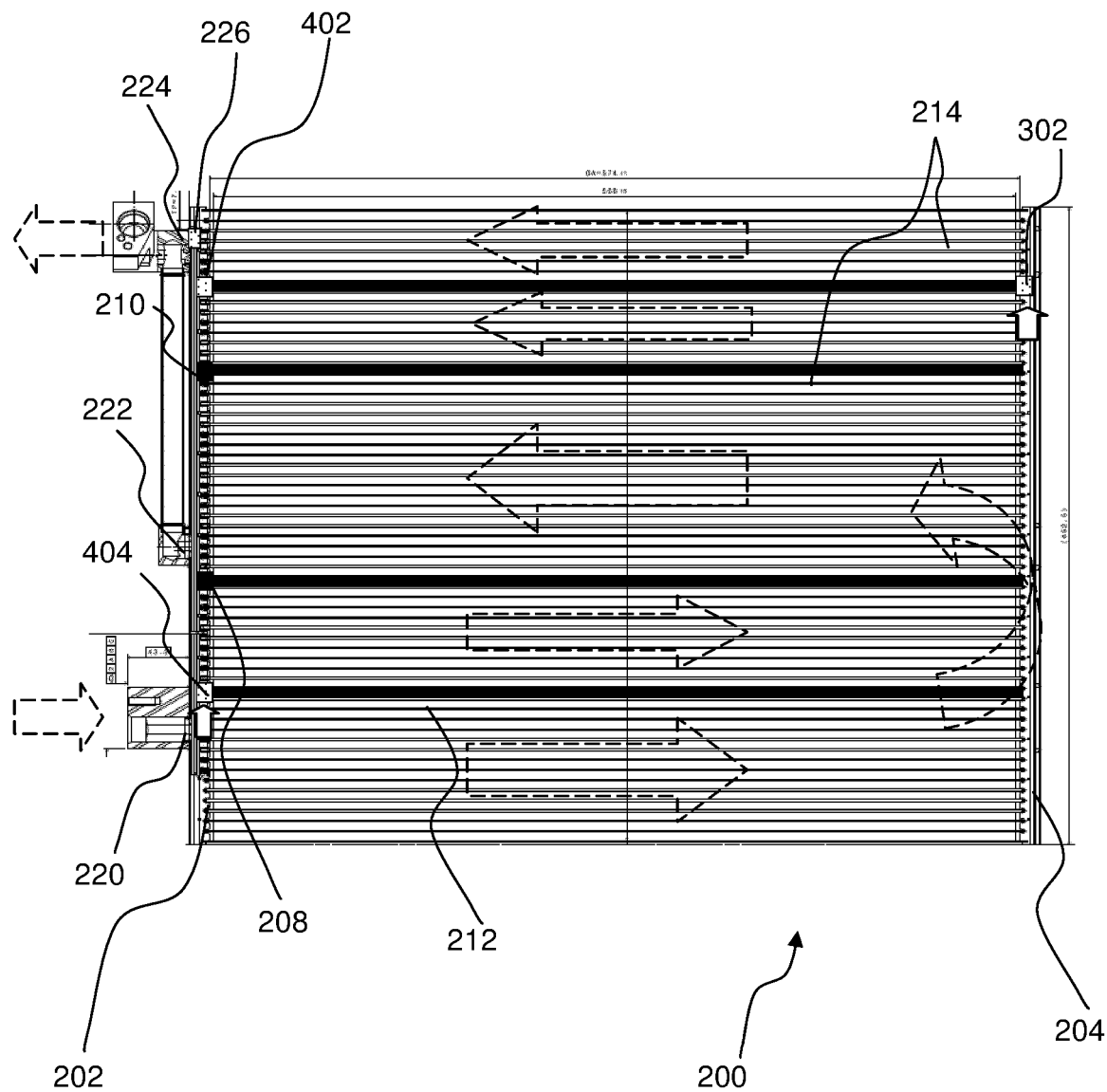
FIG. 4 illustrates a schematic view of the multi-segment heat exchanger having multiple subsections in a second set of tubes, in accordance with an embodiment of the present invention.

FIG. 4 illustrates a schematic view of the heat exchanger 200 having multiple subsections in the second set of tubes 214, in accordance with an embodiment of the present subject matter. The heat exchanger 200 further includes a third perforated blocking element 402 provided in the first manifold 202 posterior to the second blocking element 210, to divide the second set of tubes 214 into multiple segments of tubes. In one embodiment, the second perforated blocking element 302 and the third perforated blocking element 402 are a baffle having adjusting openings cross section to control flow of refrigerant therein. Further, a fourth perforated blocking element 404 is provided in the first manifold 202 anterior to the first blocking element 208 to divide the first set of tubes 212 into two segments to enable uniform distribution of refrigerant in the first set of tubes 212. In other words, the fourth perforated blocking element 404 is provided in the first manifold 202 corresponding to the first set of tubes 212 to avoid formation of dead zones in the first set of tubes 212. Further, the refrigerant may be, but not limited to, R11, R12, R113, R114, R115, R22, R123, R134a, R404a, R407C, and R410a.

Figure 5:
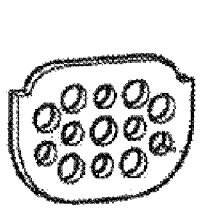
FIG. 5 illustrates various designs of the perforated blocking element.
Figure 5:
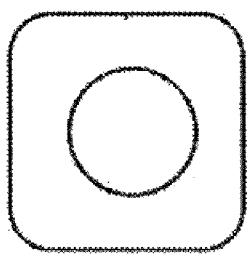
Figure 5:
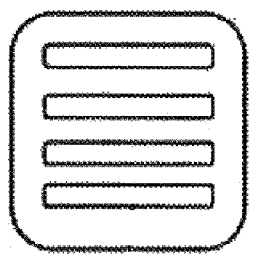
Figure 5:
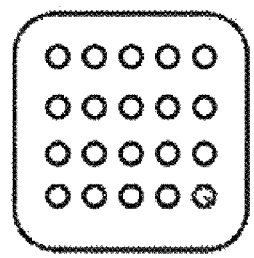
Figure 5:
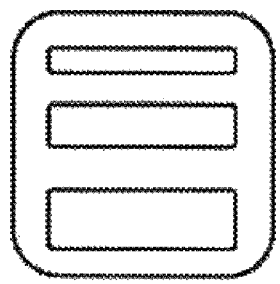
Figure 5:
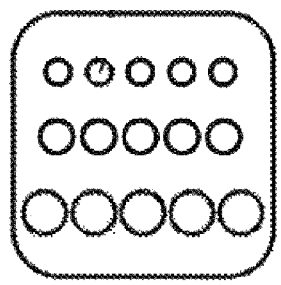
Figure 5:
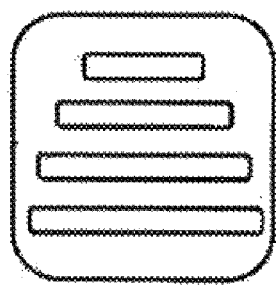
Figure 5:
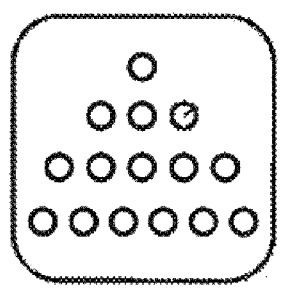

FIG. 5 illustrates various designs of the perforated blocking elements. In one embodiment, the first perforated blocking element 226, the second perforated blocking element 228, the third perforated blocking element 302, and the fourth perforated blocking elements 402 are baffles. In another embodiment, the baffles may include at least one of holes, vents and combination thereof as shown in the FIG. 5. As the refrigerant uniformly distributed throughout the plurality of tubes 206, thermal performance of the heat exchanger is increased.

In any case, the invention cannot and should not be limited to the embodiments specifically described in this document, as other embodiments might exist. The invention shall spread to any equivalent means and any technically operating combination of means.

The invention claimed is:
1. A heat exchanger, comprising:
a first manifold;
a second manifold provided opposite to the first manifold;
a plurality of tubes extending between the first manifold and the second manifold to enable flow of heat exchange fluid therein;
a first blocking element provided in the first manifold to divide the plurality of tubes into a first set of tubes and a second set of tubes, wherein the second set of tubes is in a fluid communication with the first set of tubes through the second manifold;
an inlet provided on the first manifold, corresponding to the first set of tubes, to introduce the heat exchange fluid to the first set of tubes;
a second blocking element provided in the first manifold, corresponding to the second set of tubes, to further divide the second set of tubes into a first segment of tubes and a second segment of tubes, wherein the direction of flow of the heat exchange fluid is same in both the first segment of tubes and the second segment of tubes;
a plurality of outlets provided on the first manifold, corresponding to the second set of tubes, to receive the heat exchange fluid from the second set of tubes;
a first perforated blocking element that is adapted to cooperate with at least one of the second set of tubes in the first manifold, to increase pressure drop of the heat exchange fluid at an exit of the second set of tubes; and
a second perforated blocking element and a third perforated blocking element provided in the second manifold and the first manifold respectively, corresponding to the second segment of tubes,
wherein the third perforated blocking element is posterior to the second blocking element.

2. The heat exchanger according to claim 1, further comprising:
a first outlet amongst the plurality of outlets provided on the first manifold, corresponding to the first segment of tubes, to egress the heat exchange fluid from the first segment of tubes; and
a second outlet amongst the plurality of outlets provided on the first manifold, corresponding to the second segment of tubes, to egress the heat exchange fluid from the second segment of tubes.

3. The heat exchanger according to claim 1, wherein the first perforated blocking element provided in the first manifold is adapted to partially block passage of the second outlet to facilitate uniform distribution of the heat exchange fluid in the second set of tubes.

4. The heat exchanger according to claim 1, further comprising: a fourth perforated blocking element provided in the first manifold, corresponding to the first set of tubes, to enable uniform distribution of the heat exchange fluid in the first set of tubes.

5. The heat exchanger according to claim 1, wherein a number of tubes in the second set of tubes is higher than the number of tubes in the first set of tubes.

6. The heat exchanger according to claim 5, wherein the number of tubes in the first segment of tubes is higher than the number of tubes in the second segment of tubes.

7. The heat exchanger according to claim 1, further comprising: a jumper line adapted to connect the first outlet and the second outlet to merge the first outlet and the second outlet fluidically and allow formation of an outlet block.

8. The heat exchanger according to claim 4, wherein the first perforated blocking element, the second perforated blocking element, the third perforated blocking element, and the fourth perforated blocking elements are baffles.

9. The heat exchanger according to claim 8, wherein the baffles include at least one of holes, vents and combination thereof.

* * * * *